(12) United States Patent
Shimokawa et al.

(10) Patent No.: US 11,239,458 B2
(45) Date of Patent: Feb. 1, 2022

(54) ENERGY STORAGE DEVICE AND METHOD FOR MANUFACTURING ENERGY STORAGE DEVICE

(71) Applicant: GS Yuasa International Ltd., Kyoto (JP)

(72) Inventors: Ryosuke Shimokawa, Kyoto (JP); Tomonori Kako, Kyoto (JP); Shota Ito, Kyoto (JP); Kazuki Kawaguchi, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 97 days.

(21) Appl. No.: 16/330,483

(22) PCT Filed: Sep. 6, 2017

(86) PCT No.: PCT/JP2017/032039
§ 371 (c)(1),
(2) Date: Mar. 5, 2019

(87) PCT Pub. No.: WO2018/047843
PCT Pub. Date: Mar. 15, 2018

(65) Prior Publication Data
US 2019/0221833 A1 Jul. 18, 2019

(30) Foreign Application Priority Data
Sep. 7, 2016 (JP) .............................. JP2016-174499

(51) Int. Cl.
*H01M 4/139* (2010.01)
*H01M 10/0525* (2010.01)
(Continued)

(52) U.S. Cl.
CPC ............ *H01M 4/139* (2013.01); *H01G 11/24* (2013.01); *H01G 11/86* (2013.01); *H01M 4/13* (2013.01);
(Continued)

(58) Field of Classification Search
CPC .......... H01M 4/139; H01M 4/13; H01M 4/36; H01G 11/86
See application file for complete search history.

(56) References Cited

U.S. PATENT DOCUMENTS

2006/0134521 A1* 6/2006 Shima ................... H01M 4/485
429/231.1
2010/0209763 A1 8/2010 Okamura et al.
(Continued)

FOREIGN PATENT DOCUMENTS

JP 2004-241242 A 8/2004
JP 2009-238587 A 10/2009
(Continued)

OTHER PUBLICATIONS

International Search Report dated Dec. 12, 2017 filed in PCT/JP2017/032039.
(Continued)

*Primary Examiner* — Stephan J Essex
(74) *Attorney, Agent, or Firm* — Rankin, Hill & Clark LLP

(57) ABSTRACT

An energy storage device is provided that has improved power performance at low temperature. In the present embodiment, an energy storage device is provided that includes an electrode having an active material layer, the active material layer contains at least active material particles, the particles contained in the active material layer gives a volume-based particle size frequency distribution that has a first peak and a second peak appearing in a particle (Continued)

size larger than a particle size of the first peak, and particles having particle sizes equal to or smaller than a particle size Dx have a volume proportion of 49% or more and 62% or less in a volume of whole particles contained in the active material layer, with the particle size Dx defined as a particle size at a local minimum frequency between the first peak and the second peak in the particle size frequency distribution.

16 Claims, 8 Drawing Sheets

(51) Int. Cl.
    *H01M 4/505* (2010.01)
    *H01M 4/525* (2010.01)
    *H01M 4/62* (2006.01)
    *H01M 4/13* (2010.01)
    *H01M 4/36* (2006.01)
    *H01G 11/86* (2013.01)
    *H01G 11/24* (2013.01)
    *H01M 4/02* (2006.01)

(52) U.S. Cl.
    CPC ............ *H01M 4/36* (2013.01); *H01M 4/505* (2013.01); *H01M 4/525* (2013.01); *H01M 4/621* (2013.01); *H01M 10/0525* (2013.01); *H01M 2004/021* (2013.01); *Y02E 60/13* (2013.01)

(56) References Cited

U.S. PATENT DOCUMENTS

| | | | |
|---|---|---|---|
| 2012/0258365 A1* | 10/2012 | Yokoyama | C01G 51/42 429/223 |
| 2013/0052535 A1 | 2/2013 | Yanagihara et al. | |
| 2013/0122348 A1 | 5/2013 | Ishibashi et al. | |
| 2013/0309564 A1* | 11/2013 | Yoshida | H01M 10/0525 429/200 |
| 2014/0342230 A1 | 11/2014 | Watanabe et al. | |
| 2015/0093580 A1 | 4/2015 | Kobayashi et al. | |
| 2015/0263341 A1 | 9/2015 | Kato et al. | |
| 2015/0325838 A1 | 11/2015 | Tamaki et al. | |
| 2015/0372309 A1 | 12/2015 | Yachi et al. | |

FOREIGN PATENT DOCUMENTS

| | | | |
|---|---|---|---|
| JP | 2009238587 A | * | 10/2009 |
| JP | 2012-243710 A | | 12/2012 |
| JP | 2013-55000 A | | 3/2013 |
| JP | 2013-105703 A | | 5/2013 |
| JP | 5522844 B2 | | 6/2014 |
| JP | 5630669 B2 | | 11/2014 |
| JP | 2015-222696 A | | 12/2015 |
| JP | 6907223 B2 | | 4/2016 |
| JP | 2016-201209 A | | 12/2016 |
| JP | 2017-054649 A | | 3/2017 |
| JP | 2017-063040 A | | 3/2017 |
| JP | 2017-068939 A | | 4/2017 |
| JP | 6119796 | | 4/2017 |
| WO | 2009141991 A1 | | 11/2009 |
| WO | 2014061580 A1 | | 4/2014 |
| WO | 2014104234 A1 | | 7/2014 |
| WO | 2014115852 A1 | | 7/2014 |
| WO | 2017/098716 A1 | | 6/2017 |

OTHER PUBLICATIONS

Extended European Search Report (EESR) dated Apr. 8, 2020 issued in corresponding European Patent Application No. 17848782.3.

\* cited by examiner (a) (b) (c)

ENERGY STORAGE DEVICE AND METHOD FOR MANUFACTURING ENERGY STORAGE DEVICE

TECHNICAL FIELD

The present invention relates to an energy storage device such as a lithium ion secondary battery, and a method for manufacturing the energy storage device.

BACKGROUND ART

A lithium ion secondary battery is conventionally known that includes an electrode having a current collector and an active material layer containing particles of an active material (for example, Patent Document 1).

In the battery disclosed in Patent Document 1, the active material layer contains particles of a monoclinic ß-type titanium composite oxide and particles of lithium titanate having a spinel structure. In the battery disclosed in Patent Document 1, a first peak P1 appears in a range of 0.3 μm or more and 3 μm or less and a second peak P2 appears in a range of 5 μm or more and 20 μm or less when a particle size frequency distribution of the particles contained in the active material layer is measured by a laser diffraction and scattering method, and a ratio FP1/FP2 of a frequency FP1 of the first peak P1 to a frequency FP2 of the second peak P2 is 0.4 or more and 2.3 or less.

The battery disclosed in Patent Document 1 sometimes has insufficient power performance at low temperature, and an energy storage device is required that has improved power performance at low temperature.

PRIOR ART DOCUMENT

Patent Document

Patent Document 1: JP-A-2013-105703

SUMMARY OF THE INVENTION

Problems to be Solved by the Invention

An object of one embodiment is to provide an energy storage device that has improved power performance at low temperature. Another object is to provide a method for manufacturing the energy storage device.

Means for Solving the Problems

An energy storage device according to an embodiment includes an electrode having an active material layer, the active material layer contains at least active material particles, the particles contained in the active material layer gives a volume-based particle size frequency distribution that has a first peak and a second peak appearing in a particle size larger than a particle size of the first peak, and particles having particle sizes equal to or smaller than a particle size Dx have a volume proportion of 49% or more and 62% or less in a volume of whole particles contained in the active material layer, with the particle size Dx defined as a particle size at a local minimum frequency between the first peak and the second peak in the particle size frequency distribution. This configuration enables provision of an energy storage device that has improved power performance at low temperature.

In the energy storage device, the active material layer contains secondary particles formed by aggregation of primary particles of an active material, and the secondary particles of the active material may have a pore formed therein, with the pore being equal to or larger than particle sizes of the primary particles constituting the secondary particles. This configuration forms inner surfaces of the secondary particles to increase the specific surface area of the secondary particles and thus efficiently progress a reaction on a surface of the active material during generation of power.

In the energy storage device, the particles having particle sizes equal to or smaller than the particle size Dx may have a volume proportion of 52% or more and 60% or less in the volume of the whole particles contained in the active material layer. This configuration improves the power performance at low temperature.

A method for manufacturing an energy storage device according to an embodiment includes preparing an electrode that has an active material layer containing at least active material particles, the preparing the electrode includes pressing the active material layer containing secondary particles formed by aggregation of primary particles of an active material, the pressing the active material layer includes crushing a part of the secondary particles to allow the particles contained in the active material layer pressed to give a volume-based particle size frequency distribution that has a first peak and a second peak appearing in a particle size larger than a particle size of the first peak, and crushing the part of the secondary particles to allow particles having particle sizes equal to or smaller than a particle size Dx to have a volume proportion of 49% or more and 62% or less in a volume of whole particles contained in the active material layer, with the particle size Dx defined as a particle size at a local minimum frequency between the first peak and the second peak in the particle size frequency distribution. This manufacturing method including such procedures is capable of providing an energy storage device that has improved power performance at low temperature.

Advantages of the Invention

According to the present embodiment, it is possible to provide an energy storage device having improved power performance at low temperature, and a method for manufacturing the energy storage device.

MODE FOR CARRYING OUT THE INVENTION

Figure 1:
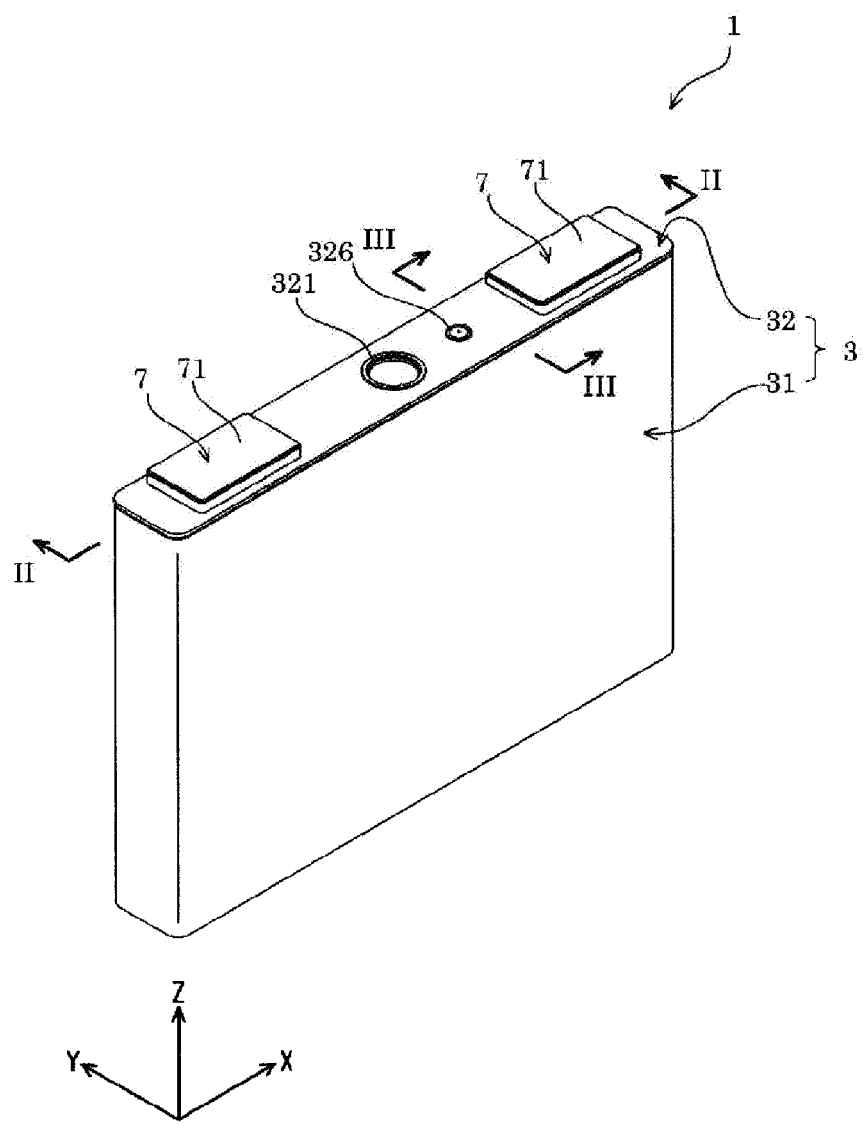
FIG. 1 is a perspective view of an energy storage device according to the present embodiment.

Hereinafter, one embodiment of an energy storage device according to the present invention is described with reference to FIGS. 1 to 5. Examples of the energy storage device include a primary battery, a secondary battery, and a capacitor. In the present embodiment, described as one example of the energy storage device is a chargeable and dischargeable secondary battery. The names of constituent members (constituent elements) in the present embodiment are those used in the present embodiment and are sometimes different from the names of the constituent members (constituent elements) in BACKGROUND ART.

An energy storage device 1 according to the present embodiment is a nonaqueous electrolyte secondary battery. In more detail, the energy storage device 1 is a lithium ion secondary battery that utilizes electron migration generated along with migration of lithium ions. This kind of energy storage device 1 supplies electric energy. The energy storage device 1 is used alone or in multiple devices. Specifically, the energy storage device 1 is used alone when required power and voltage are small. On the other hand, the energy storage device 1 in combination with another energy storage device 1 is used in an energy storage apparatus 100 when at least one of required power or voltage is large. In the energy storage apparatus 100, the energy storage devices 1 used in the energy storage apparatus 100 supply electric energy.

The energy storage device 1 includes, as shown in FIGS. 1 to 5, an electrode assembly 2 having a positive electrode 11 and a negative electrode 12, a case 3 that houses the electrode assembly 2, and an external terminal 7 that is disposed on an outer surface of the case 3 and electrically conductive with the electrode assembly 2. The energy storage device 1 also includes, for example, a current collector 5 that allows electrical conduction between the electrode assembly 2 and the external terminal 7, in addition to the electrode assembly 2, the case 3, and the external terminal 7.

The electrode assembly 2 is formed by winding a layered product 22 that includes the positive electrode 11 and the negative electrode 12 layered on top of another with a separator 4 insulating the electrodes from each other.

The positive electrode 11 includes a metal foil 111 (current collector foil) and an active material layer 112 that is layered on a surface of the metal foil 111 and contains an active material. In the present embodiment, the active material layer 112 is layered on each of both surfaces of the metal foil 111. The thickness of the positive electrode 11 is usually 40 μm or more and 150 μm or less.

The metal foil 111 is band-shaped. The metal foil 111 of the positive electrode 11 in the present embodiment is, for example, an aluminum foil. The positive electrode 11 includes a non-coated portion 115 with the positive active material layer 112 (part where no positive active material layer is formed) at one transverse, or width-wise edge of the band shape.

The positive active material layer 112 contains a particulate active material (active material particles), a particulate conduction aid, and a binder. The thickness of the positive active material layer 112 (one layer) is usually 12 μm or more and 70 μm or less. The mass per unit area of the positive active material layer 112 (one layer) is usually 6 mg/cm2 or more and 17 mg/cm2 or less. The density of the positive active material layer 112 is usually 1.5 g/cm3 or more and 3.0 g/cm3 or less. The mass per unit area and the density are for one layer disposed so as to cover one surface of the metal foil 111.

The particles contained in the positive active material layer 112 give a volume-based particle size frequency distribution that has a first peak and a second peak appearing in a particle size larger than a particle size of the first peak. Particles having particle sizes equal to or smaller than a particle size Dx have a volume proportion of 49% or more and 62% or less in a volume of whole particles contained in the active material layer, with the particle size Dx defined as a particle size at a local minimum frequency between the first peak and the second peak in the particle size frequency distribution. The volume proportion may be 52% or more and 60% or less. When the particle size frequency distribution has three or more peaks, the first peak and the second peak are the largest peak and one peak adjacent to the largest peak, respectively. When the particle size frequency distribution has a peak adjacent to the largest peak in smaller and larger particle sizes, the peak in the larger particle size is employed as the second peak.

Figure 9:
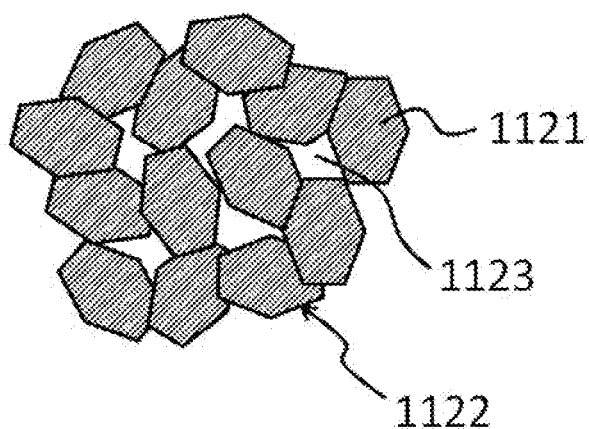
FIG. 9 is a schematic view of positive active material particles in the embodiment.
Figure 10:
FIG. 10 is a processed image in quantitative estimation for porosity of the positive active material particles in the embodiment.
Figure 10:
Figure 10:

As shown in FIG. 9, the positive active material layer 112 contains primary particles 1121 of the active material and secondary particles 1122 formed by aggregation of a plurality of primary particles 1121. In detail, the positive active material layer 112 contains the primary particles 1121 that are each present alone and the secondary particles 1122 that are formed by mutual coagulation of a plurality of primary particles. In the secondary particles 1122, the primary particles are fixed to each other. In at least a part of the secondary particles 1122, a pore 1123 is formed. The pore 1123 can be confirmed by subjecting to binarization an SEM image of a section that is obtained by cutting the positive active material layer along its thickness, with the SEM image obtained through SEM observation using an ion beam. FIG. 10 shows images obtained by subjecting to the binarization three SEM images showing positive active materials having different porosities. Here, a white region, or a region surrounded by a periphery is defined as the secondary particles, and a black region present in the secondary particles is defined as a pore. A percentage of a value obtained by dividing the area of the pore by the area of the secondary particles (including the area of the pore) is defined as porosity. The porosity of each type of particles shown in FIG. 11 is calculated as (a) 0%, (b) 9.9%, and (c) 11.4%. The porosity of the positive active material is preferably 5% or more, more preferably 10% or more. The size of pores is to be a value obtained by measuring the maximum length in ten black regions of the image and averaging the measured values. When it is impossible to measure ten black regions in the identical secondary particle, the measurement may be performed for a plurality of secondary particles. The secondary particles of the positive active material preferably has a pore formed therein, with the pore being equal to or larger than particle sizes of the primary particles constituting the secondary particles.

It is possible to increase the volume proportion by increasing pressing pressure when preparing the positive electrode 11. That is, an increase in pressing pressure enables crush of more secondary particles formed by aggregation of the primary particles to be capable of increasing the proportion of particles having smaller particle sizes in the positive active material layer 112. Mixture of the secondary particles prepared in advance with the primary particles also enables adjustment of the volume proportion.

The particle size frequency distribution represents the frequency of the particle sizes of the active material and the conduction aid. On the other hand, the binder is not reflected in the result of the particle size frequency distribution. The particle size frequency distribution is determined by measurement with a laser diffraction and scattering particle size distribution measuring apparatus. The particle size frequency distribution is determined on the basis of the volume of the particles. The measurement conditions are described in detail in EXAMPLES. In measurement of the particle size frequency distribution of the particles contained in the active material layer of a manufactured battery, for example, the battery is charged at a rate of 1.0 C until the voltage reaches 4.2 V, then discharged at a constant voltage of 4.2 V for three hours, and thereafter subjected to constant current discharge at a rate of 1.0 C to a voltage of 2.0 V. Subsequently, the battery is subjected to constant voltage discharge at 2.0 V for five hours. Then, the battery is disassembled in a dry atmosphere. The active material layer is extracted, washed with dimethyl carbonate, crushed and then subjected to vacuum drying for two hours or more. Thereafter, the measurement is performed using the particle size distribution measuring apparatus.

As described above, the particles contained in the positive active material layer 112 give a volume-based particle size frequency distribution that has a first peak and a second peak appearing in a particle size larger than a particle size of the first peak. An average diameter Dp of the primary particles of the active material and a particle size D1 of the first peak may satisfy a relational expression $0.5 \leq D1/Dp \leq 2$. The value of D1/Dp can be adjusted by changing the particle sizes of the active material particles for preparing the positive active material layer 112. For example, it is possible to increase the value of D1/Dp by employing secondary particles having particle sizes far larger than the particle sizes of the primary particles constituting the secondary particles of the active material, and preparing the positive active material layer 112 from a composite (described later) having the secondary particles blended therein.

The average diameter Dp of the primary particles of the active material particles in the positive active material layer 112 is usually 0.1 µm or more and 2.0 µm or less. The average diameter Dp of the primary particles is an average diameter of the primary particles that are each present alone (present independently from each other) in the positive active material layer 112. The average diameter Dp of the primary particles is determined by measuring diameters of at least one hundred primary particles in a scanning electron microscope observation image of a section of the positive active material layer 112 along its thickness and averaging the measured values. When a primary particle is not spherical, the longest diameter is measured as the diameter.

In the particle size frequency distribution, the particle size D1 of the first peak is usually 0.1 µm or more and 1.0 µm or less. A particle size D2 of the second peak is usually 2 µm or more and 5 µm or less. The particle size Dx at the local minimum frequency between the first peak and the second peak is usually 1.0 µm or more and 3.0 µm or less. A ratio of the particle size D2 of the second peak to the particle size D1 of the first peak is usually 0.02 or more and 0.5 or less.

The porosity of the positive active material layer 112 is usually 25% or more and 45% or less. The porosity is calculated on the basis of the results of measurement by a mercury intrusion technique. The mercury intrusion technique can be performed using a mercury intrusion porosimeter. Specifically, the mercury intrusion technique is performed in accordance with Japanese Industrial Standards (JIS R1655: 2003). A porosity P (%) is calculated by an equation $P=(A/V) \times 100$, using a mercury intrusion amount ($cm^3$) as A and an apparent volume ($cm^3$) of the positive active material layer as V. Here, the apparent volume V ($cm^3$) is one obtained by multiplying the plan-view area ($cm^2$) of the active material layer by the thickness (cm) of the active material layer. When the porosity of the positive active material layer 112 is measured in a manufactured battery, for example, the battery is discharged and then disassembled in a dry atmosphere. Next, the positive active material layer 112 is extracted, washed with dimethyl carbonate, and then subjected to vacuum drying for two hours or more. Thereafter, the porosity of the positive active material layer 112 can be calculated on the basis of the results of the measurement using the mercury intrusion porosimeter.

The active material of the positive electrode 11 is a compound capable of storing and releasing lithium ions. The active material of the positive electrode 11 is, for example, a lithium metal oxide. Specific examples of the active material of the positive electrode include composite oxides (such as $Li_pCo_sO_2$, $Li_pNi_qO_2$, $Li_pMn_rO_4$, and $Li_pNi_q$-$Co_sMn_rO_2$) represented by $Li_pMeO_t$ (Me represents one or two or more transition metals) and polyanionic compounds (such as $Li_pFe_uPO_4$, $Li_pMn_uPO_4$, $Li_pMn_uSiO_4$, and $Li_pCo_uPO_4F$) represented by $Li_pMe_u(XO_v)_w$ (Me represents one or two or more transition metals and X represents, for example, P, Si, B, or V).

The active material of the positive electrode 11 may also be a lithium metal composite oxide represented by a chemical composition $Li_{1-x}Ni_aMn_bCo_cM_dO_{2-\delta}$. In the chemical composition, x, a, b, c, d, and δ satisfy: $0 < x < 1$, $a+b+c+d=1$, $0 \leq a \leq 1$, $0 \leq b \leq 1$, $0 \leq c \leq 1$, $0 \leq d \leq 1$, and $0 \leq \delta \leq 0.5$, and M is at least one selected from the group consisting of B, Mg, Al, Ti, V, Zn, Y, Zr, Mo, and W.

In the present embodiment, the active material of the positive electrode 11 is a lithium metal composite oxide represented by a chemical composition $Li_pNi_qMn_rCo_sO_t$ (in which p, q, r, s, and t satisfy: $0 < p \leq 1.3$, $q+r+s=1$, $0 \leq q \leq 1$, $0 \leq r \leq 1$, $0 \leq s \leq 1$, and $1.7 \leq t \leq 2.3$). Alternatively, q, r, and s may satisfy $0 < q < 1$, $0 < r < 1$, and $0 < s < 1$, respectively.

Examples of the lithium metal composite oxide represented by the chemical composition $Li_pNi_qMn_rCo_sO_t$ as described above include $LiNi_{1/3}Co_{1/3}Mn_{1/3}O_2$, $LiNi_{1/6}Co_{1/6}Mn_{2/3}O_2$, and $LiCoO_2$.

Examples of the binder used in the positive active material layer 112 include polyvinylidene fluoride (PVdF), a copolymer of ethylene and vinyl alcohol, polymethyl methacrylate, polyethylene oxide, polypropylene oxide, polyvinyl alcohol, polyacrylic acid, polymethacrylic acid, and styrene-butadiene rubber (SBR). The binder in the present embodiment is polyvinylidene fluoride.

The conduction aid of the positive active material layer 112 is a carbonaceous material containing 98% by mass or more of carbon. Examples of the carbonaceous material include ketjen black (registered trade mark), acetylene black, and graphite. The positive active material layer 112 in the present embodiment contains acetylene black as the conduction aid.

The negative electrode 12 includes a metal foil 121 (current collector foil) and a negative active material layer 122 formed on the metal foil 121. In the present embodiment, the negative active material layer 122 is layered on each of both surfaces of the metal foil 121. The metal foil 121 is band-shaped. The metal foil 121 of the negative electrode in the present embodiment is, for example, a copper foil. The negative electrode 12 includes a non-coated portion 125 with the negative active material layer 122 (part where no negative active material layer is formed) at one transverse, or width-wise edge of the band shape. The thickness of the negative electrode 12 is usually 40 μm or more and 150 μm or less.

The negative active material layer 122 contains a particulate active material (active material particles) and a binder. The negative active material layer 122 is disposed so as to face the positive electrode 11 with the separator 4 interposed therebetween. The negative active material layer 122 has a width larger than the width of the positive active material layer 112.

The active material of the negative electrode 12 is capable of contributing to electrode reactions such as a charge reaction and a discharge reaction in the negative electrode 12. For example, the active material of the negative electrode 12 is a carbon material such as graphite or amorphous carbon (hardly graphitizable carbon or easily graphitizable carbon), or a material that causes an alloying reaction with lithium ions, such as silicon (Si) or tin (Sn). The active material of the negative electrode in the present embodiment is amorphous carbon. More specifically, the active material of the negative electrode is hardly graphitizable carbon.

The thickness of the negative active material layer 122 (one layer) is usually 10 μm or more and 50 μm or less. The mass per unit area of the negative active material layer 122 (one layer) is usually 0.3 g/100 cm2 or more and 1.0 g/100 cm2 or less. The density of the negative active material layer 122 (one layer) is usually 0.9 g/cm3 or more and 1.2 g/cm3 or less.

The binder used in the negative active material layer is the same as the binder used in the positive active material layer. The binder in the present embodiment is styrene-butadiene rubber (SBR).

In the negative active material layer 122, the binder may have a proportion of 5% by mass or more and 10% by mass or less to the total mass of the active material particles and the binder.

The negative active material layer 122 may further contain a conduction aid such as ketjen black (registered trade mark), acetylene black, or graphite. The negative active material layer 122 in the present embodiment contains no conduction aid.

The electrode assembly 2 in the present embodiment is formed by winding the thus configured positive electrode 11 and negative electrode 12 with the separator 4 insulating the electrodes from each other. That is, the electrode assembly 2 in the present embodiment is formed by winding the layered product 22 including the positive electrode 11, the negative electrode 12, and the separator 4. The separator 4 is a member having insulation quality. The separator 4 is disposed between the positive electrode 11 and the negative electrode 12. This configuration insulates the positive electrode 11 from the negative electrode 12 in the electrode assembly 2 (specifically, the layered product 22). The separator 4 retains an electrolyte solution in the case 3. This configuration allows lithium ions to migrate between the positive electrode 11 and the negative electrode 12 that are alternately layered with the separator 4 sandwiched therebetween during charge-discharge of the energy storage device 1.

The separator 4 is band-shaped. The separator 4 includes a porous separator substrate. The separator 4 is disposed between the positive electrode 11 and the negative electrode 12 to prevent a short circuit between the positive electrode 11 and the negative electrode 12. The separator 4 in the present embodiment only includes a separator substrate 41.

The separator substrate 41 has a porous form. The separator substrate 41 is, for example, woven fabric, non-woven fabric, or a porous film. Examples of a material for the separator substrate include a polymer compound, glass, and ceramic. The polymer compound is, for example, at least one selected from the group consisting of polyesters such as polyacrylonitrile (PAN), a polyamide (PA), and polyethylene terephthalate (PET), polyolefins (PO) such as polypropylene (PP) and polyethylene (PE), and cellulose.

Figure 4:
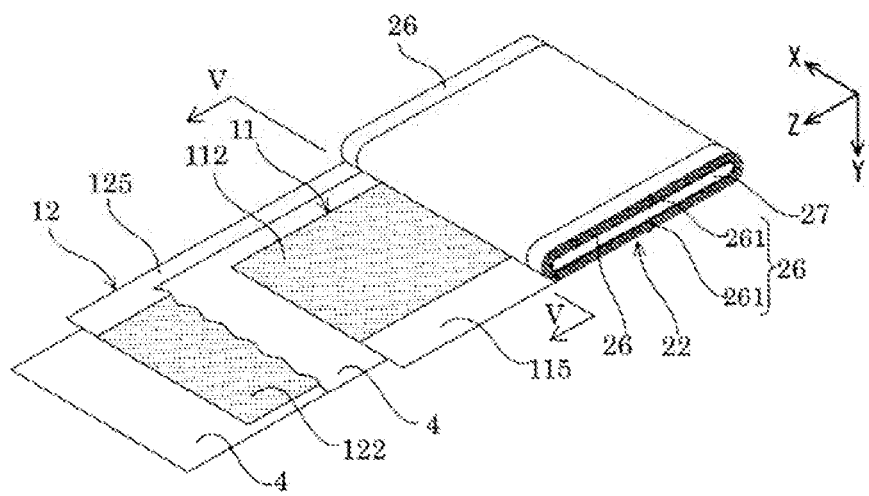
FIG. 4 is a view for illustrating a configuration of an electrode assembly of the energy storage device according to the embodiment.
Figure 5:
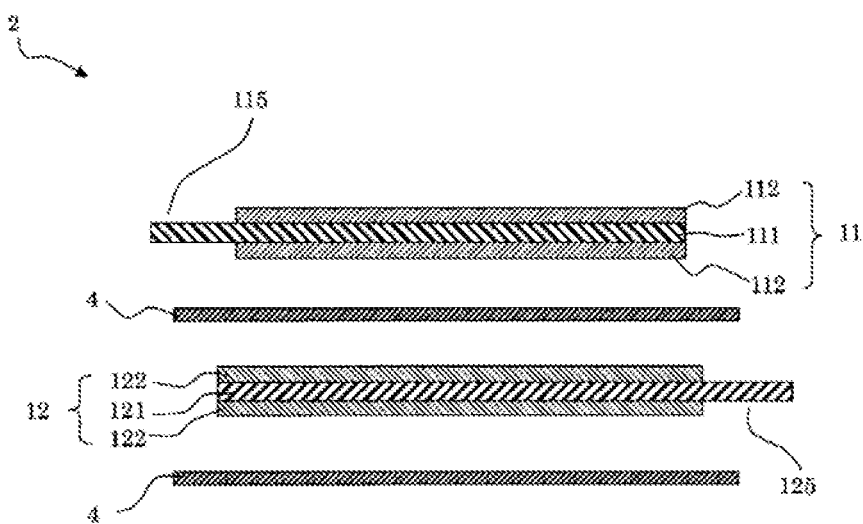
FIG. 5 is a sectional view of a positive electrode, a negative electrode, and a separator that are layered on top of another (a V-V section of FIG. 4).

The width of the separator 4 (transverse dimension of the band shape) is slightly larger than the width of the negative active material layer 122. The separator 4 is disposed between the positive electrode 11 and the negative electrode 12 that are transversely shifted and layered on top of another such that the positive active material layer 112 overlaps with the negative active material layer 122. In the layering, the non-coated portion 115 of the positive electrode 11 does not overlap with the non-coated portion 125 of the negative electrode 12 as shown in FIG. 4. That is, the non-coated portion 115 of the positive electrode 11 transversely protrudes from a region where the positive electrode 11 overlaps with the negative electrode 12, whereas the non-coated portion 125 of the negative electrode 12 transversely (oppositely from the protrusion of the non-coated portion 115 of the positive electrode 11) protrudes from the region where the positive electrode 11 overlaps with the negative electrode 12. The layered positive electrode 11, negative electrode 12, and separator 4, or the layered product 22 is wound to form the electrode assembly 2. A part where only the non-coated portion 115 of the positive electrode 11 or the non-coated portion 125 of the negative electrode 12 is layered forms a non-coated layered portion 26 in the electrode assembly 2.

The non-coated layered portion 26 is a part of the electrode assembly 2 that is electrically conductive with the current collector 5. The non-coated layered portion 26 is sectioned into two parts (two divided non-coated layered portions) 261 with a hollow portion 27 (see FIG. 4) sandwiched between the parts in view toward the winding center of the wound positive electrode 11, negative electrode 12, and separator 4.

The thus configured non-coated layered portion 26 is provided in each of the electrodes of the electrode assembly 2. That is, the non-coated layered portion 26 obtained by layering only the non-coated portion 115 of the positive electrode 11 forms the non-coated layered portion of the positive electrode 11 in the electrode assembly 2, and the non-coated layered portion 26 obtained by layering only the non-coated portion 125 of the negative electrode 12 forms the non-coated layered portion of the negative electrode 12 in the electrode assembly 2.

The case 3 includes a case main body 31 having an opening, and a cover plate 32 that covers (closes) the opening of the case main body 31. The case 3 houses in an inner space thereof an electrolyte solution together with, for example, the electrode assembly 2 and the current collector 5. The case 3 is formed of a metal having resistance to the electrolyte solution. The case 3 is formed of, for example, an aluminum-based metal material such as aluminum or an aluminum alloy. The case 3 may be formed of, for example, a metal material such as stainless steel or nickel, or a composite material obtained by bonding a resin such as nylon to aluminum.

The electrolyte solution is a nonaqueous electrolyte solution. The electrolyte solution is obtained by dissolving an electrolyte salt in an organic solvent. Examples of the organic solvent include cyclic carbonate esters such as propylene carbonate and ethylene carbonate, and chain carbonates such as dimethyl carbonate, diethyl carbonate, and ethyl methyl carbonate. Examples of the electrolyte salt include $LiClO_4$, $LiBF_4$, and $LiPF_6$. The electrolyte solution in the present embodiment is one obtained by dissolving 0.5 to 1.5 mol/L of LiPF6 in a mixed solvent obtained by mixing propylene carbonate, dimethyl carbonate, and ethyl methyl carbonate in a predetermined ratio.

The case 3 is formed by joining a periphery of the opening of the case main body 31 with a periphery of the cover plate 32 that is rectangular while the peripheries are layered on top of another. The case 3 includes the inner space defined by the case main body 31 and the cover plate 32. In the present embodiment, the periphery of the opening of the case main body 31 is joined with the periphery of the cover plate 32 by welding.

Hereinafter, as shown in FIG. 1, the long side line of the cover plate 32 is defined as an X-axis, the short side line of the cover plate 32 as a Y-axis, and the normal of the cover plate 32 as a Z-axis. The case main body 31 has a prismatic tube shape whose one end along a line between openings (Z-axis) is covered (that is, a bottomed prismatic tube shape). The cover plate 32 is a tabular member that covers the opening of the case main body 31.

The cover plate 32 includes a gas release valve 321 capable of exteriorly releasing gas in the case 3. The gas release valve 321 exteriorly releases gas from within the case 3 when the internal pressure of the case 3 has risen to a predetermined pressure. The gas release valve 321 is provided in a center portion along the X-axis of the cover plate 32.

The case 3 is provided with an electrolyte solution filling hole for injecting the electrolyte solution therethrough. The electrolyte solution filling hole communicates between the interior and the exterior of the case 3. The electrolyte solution filling hole is provided on the cover plate 32. The electrolyte solution filling hole is sealed (covered) with an electrolyte solution filling plug 326. The electrolyte solution filling plug 326 is fixed to the case 3 (the cover plate 32 in an example of the present embodiment) by welding.

The external terminal 7 is a part that is electrically connected to, for example, the external terminal 7 of another energy storage device 1 or external equipment. The external terminal 7 is formed of a member having conductivity. For example, the external terminal 7 is formed of an aluminum-based metal material such as aluminum or an aluminum alloy, or a highly weldable metal material such as a copper-based metal material (e.g., copper or a copper alloy).

The external terminal 7 has a surface 71 weldable with, for example, a bus bar. The surface 71 is a flat surface. The external terminal 7 has a tabular shape extending along the cover plate 32. In detail, the external terminal 7 has a rectangular tabular shape in Z-axis view.

The current collector 5 is disposed in the case 3 and is directly or indirectly connected to the electrode assembly 2 in an electrically conductive manner. The current collector 5 in the present embodiment is connected to the electrode assembly 2 in an electrically conductive manner with a clip member 50 interposed therebetween. That is, the energy storage device 1 includes the clip member 50 that enables connection between the electrode assembly 2 and the current collector 5 in an electrically conductive manner.

Figure 2:
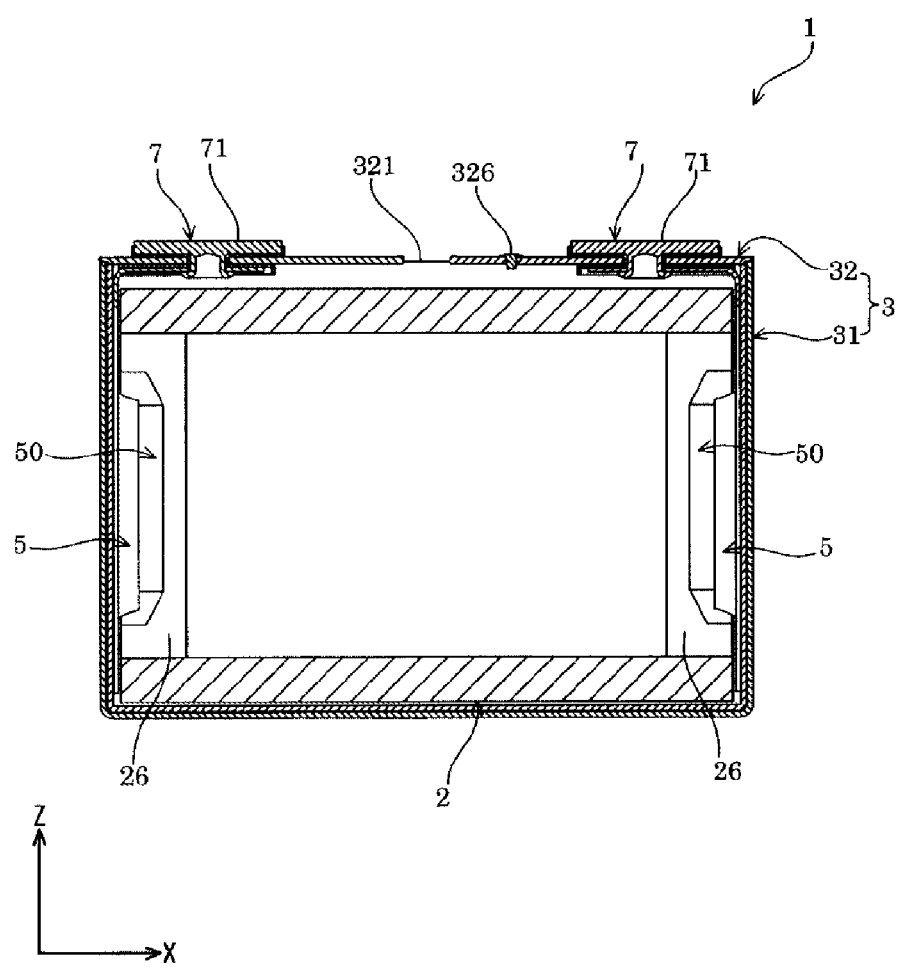
FIG. 2 is a sectional view taken along a line II-II in FIG. 1.
Figure 3:
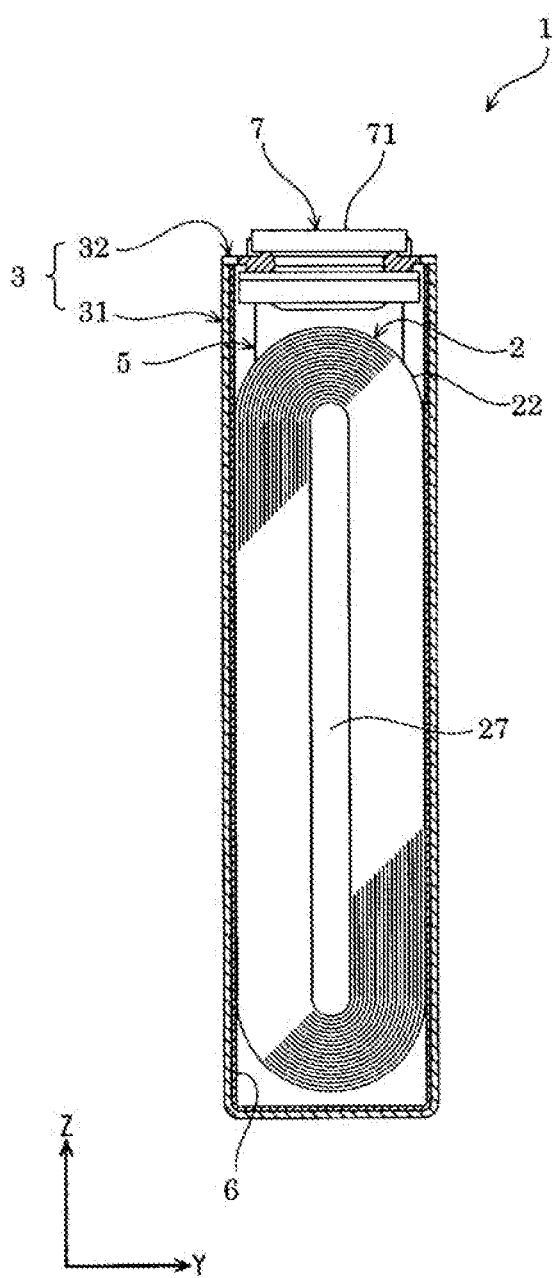
FIG. 3 is a sectional view taken along a line III-III in FIG. 1.

The current collector 5 is formed of a member having conductivity. As shown in FIG. 2, the current collector 5 is disposed along an inner surface of the case 3. The current collector 5 is disposed on each of the positive electrode 11 and the negative electrode 12 in the energy storage device 1. In the energy storage device 1 according to the present embodiment, the current collector 5 is, in the case 3, disposed on each of the non-coated layered portion 26 of the positive electrode 11 and the non-coated layered portion 26 of the negative electrode 12 in the electrode assembly 2.

The current collector 5 of the positive electrode 11 and the current collector 5 of the negative electrode 12 are formed of different materials. Specifically, the current collector 5 of the positive electrode 11 is formed of, for example, aluminum or an aluminum alloy and the current collector 5 of the negative electrode 12 is formed of, for example, copper or a copper alloy.

In the energy storage device 1 according to the present embodiment, the case 3 houses therein the electrode assembly 2 (specifically, the electrode assembly 2 and the current collector 5) housed in a bag-shaped insulating cover 6 that insulates the electrode assembly 2 from the case 3.

Figure 6:
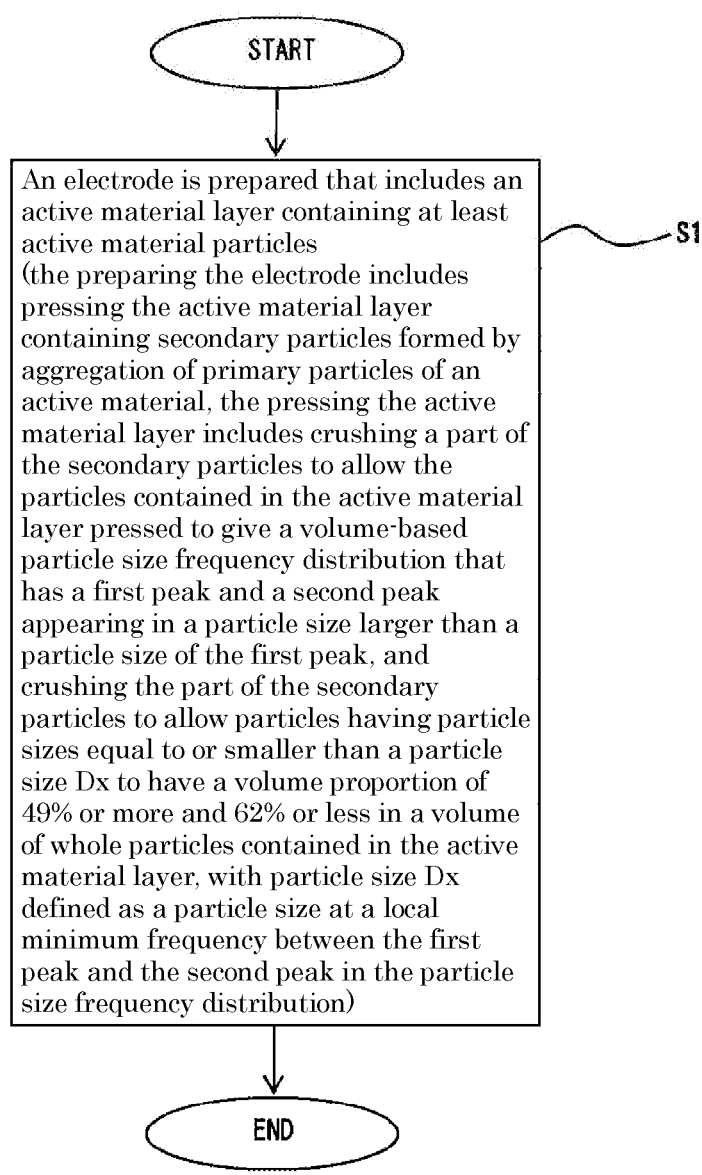
FIG. 6 is a flowchart showing steps of a method for manufacturing an energy storage device.

Next, a method for manufacturing the energy storage device according to the embodiment is described with reference to FIG. 6.

In the manufacturing method, an electrode is prepared that includes an active material layer containing at least active material particles (step 1 S1). Further, in the manufacturing method, an energy storage device is usually assembled using the prepared electrode, an electrolyte solution, and a case (step 2).

In the step 1, in order to prepare the active material layer of at least either one of a positive electrode and a negative electrode, the active material layer that contains secondary particles formed by aggregation of primary particles of an active material is pressed to crush a part of the secondary particles. The particles contained in the active material layer pressed gives a volume-based particle size frequency distribution that has a first peak and a second peak appearing in a particle size larger than a particle size of the first peak, and particles having particle sizes equal to or smaller than a particle size Dx have a volume proportion of 49% or more and 62% or less in a volume of whole particles contained in the active material layer, with the particle size Dx defined as a particle size at a local minimum frequency between the first peak and the second peak in the particle size frequency distribution.

For example, in the step 1, a positive electrode composite is prepared that is obtained by mixing active material particles, a particulate conduction aid, a binder, and an organic solvent. The positive electrode composite is applied to each of both surfaces of the metal foil 111 for the positive electrode to form the positive active material layer 112. As the application method for forming the positive active material layer 112, a general method is employed. Further, the positive active material layer 112 is pressed by, for example, roll pressing. Changing pressing pressure enables adjustment of the volume proportion of the particles having particle sizes equal to or smaller than the particle size Dx. Specifically, increasing the pressing pressure enables crush of more secondary particles to thus enable an increase in volume proportion of the particles having particles sizes equal to or smaller than the particle size Dx. The negative active material layer 122 can also be formed similarly.

In the step 2, the layered product 22 is wound that includes the positive electrode 11 and the negative electrode 12 with the separator 4 sandwiched therebetween, to form the electrode assembly 2. In the formation of the electrode assembly 2, the layered product 22 is prepared by layering the positive electrode 11, the separator 4, and the negative electrode 12 on top of another such that the positive active material layer 112 and the negative active material layer 122 face each other with the separator 4 interposed therebetween. Next, the layered product 22 is wound to form the electrode assembly 2.

In the step 2, the electrode assembly 2 is put in the case main body 31 of the case 3, the opening of the case main body 31 is covered with the cover plate 32, and the electrolyte solution is injected into the case 3. When the opening of the case main body 31 is covered with the cover plate 32, the electrode assembly 2 is put in the case main body 31 and the opening of the case main body 31 is covered with the cover plate 32 while the positive electrode 11 is electrically conductive with one external terminal 7 and the negative electrode 12 is electrically conductive with the other external terminal 7. When the electrolyte solution is injected into the case 3, the electrolyte solution is injected into the case 3 through an injection hole on the cover plate 32 of the case 3.

The thus configured energy storage device 1 according to the present embodiment includes, as an electrode, the positive electrode 11 including the positive active material layer 112. The positive active material layer 112 contains at least active material particles and a particulate conduction aid. The particles contained in the positive active material layer 112 give a volume-based particle size frequency distribution that has a first peak and a second peak appearing in a particle size larger than a particle size of the first peak. Particles having particle sizes equal to or smaller than a particle size Dx have a volume proportion of 49% or more and 62% or less in a volume of whole particles contained in the active material layer, with the particle size Dx defined as a particle size at a local minimum frequency between the first peak and the second peak in the particle size frequency distribution. This configuration enables provision of an energy storage device that has improved power performance at low temperature.

In the energy storage device 1, the positive active material layer 112 contains secondary particles formed by aggregation of primary particles of an active material, and the secondary particles of the active material may have a pore formed therein, with the pore being equal to or larger than particle sizes of the primary particles constituting the secondary particles. This configuration forms inner surfaces of the secondary particles to increase the specific surface area of the secondary particles and thus efficiently progress a reaction on a surface of the active material during generation of power. When the positive active material layer 112 containing the secondary particles is pressed to prepare the positive electrode 11, the secondary particles having a pore formed therein are pressed to be relatively easily crushed, enabling relatively easy crush of the secondary particles into the primary particles.

In the energy storage device 1, the particles having particle sizes equal to or smaller than the particle size Dx may have a volume proportion of 52% or more and 60% or less in the volume of the whole particles contained in the positive active material layer 112. This configuration further improves the power performance at low temperature.

The energy storage device according to the present invention is not limited to the embodiment, and it is, needless to say, possible to variously change the energy storage device within a scope not departing from the gist of the present invention. For example, it is possible to add the configuration of one embodiment to the configuration of another embodiment, or it is possible to substitute a part of the configuration of one embodiment with the configuration of another embodiment. Further, it is possible to remove a part of the configuration of one embodiment.

In the embodiment, the positive electrode has been described in detail in which the active material layer containing an active material is in direct contact with the metal foil. In the present invention, however, the positive electrode may include a conductive layer that contains a binder and a conduction aid and is disposed between the active material layer and the metal foil.

In the embodiment, the electrodes have been described in each of which the active material is disposed on each of both sides of the metal foil. In the energy storage device according to the present invention, however, the positive electrode 11 or the negative electrode 12 may include the active material layer only on one side of the metal foil.

In the embodiment, the energy storage device 1 has been described in detail that includes the electrode assembly 2 formed by winding the layered product 22. The energy storage device according to the present invention, however, may include an unwound layered product 22. In detail, the energy storage device may include an electrode assembly formed by layering the positive electrode, the separator, the negative electrode, and the separator, which are all formed in rectangle, in this order a plurality of times.

In the embodiment, the case has been described in which the energy storage device 1 is used as a chargeable and dischargeable nonaqueous electrolyte secondary battery (for example, a lithium ion secondary battery). The energy storage device 1, however, can be any type and any size (capacity). In the embodiment, the lithium ion secondary battery has been described as one example of the energy storage device 1. The energy storage device, however, is not limited to this example. For example, the present invention is applicable to various secondary batteries, in addition to an energy storage device such as a primary battery or a capacitor, e.g., an electric double-layer capacitor.

Figure 7:
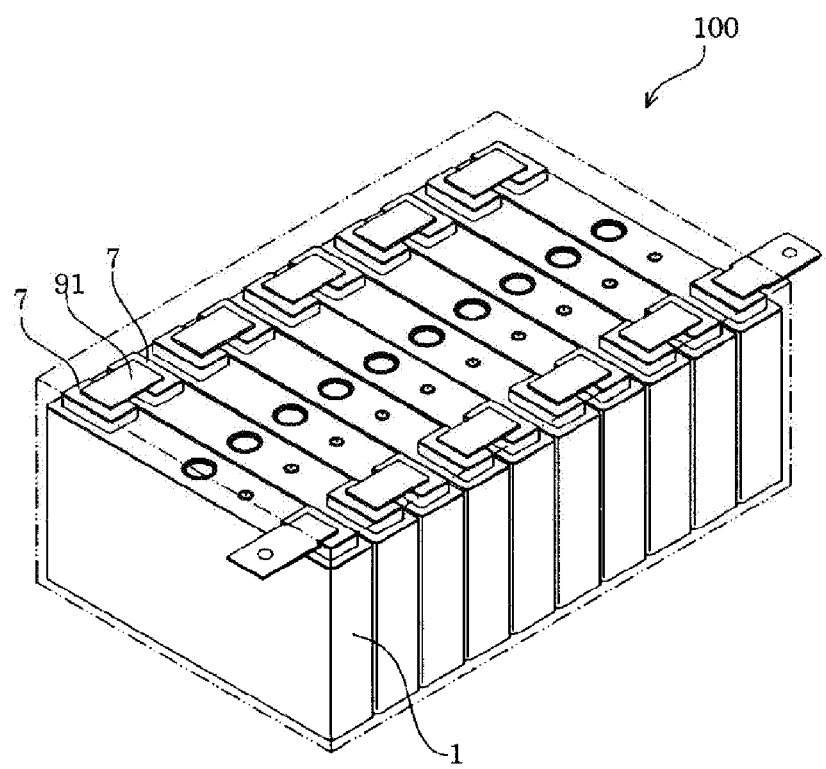
FIG. 7 is a perspective view of an energy storage apparatus including energy storage devices according to the embodiment.

The energy storage device 1 (for example, a battery) may be included in an energy storage apparatus 100 (a battery module in the case of using the energy storage device as a battery) shown in FIG. 7. The energy storage apparatus 100 includes at least two energy storage devices 1 and a bus bar member 91 electrically connecting the two (different) energy storage devices 1 with each other. In this case, it is acceptable if the technique of the present invention is applied to at least one of the energy storage devices.

EXAMPLES

A nonaqueous electrolyte secondary battery (lithium ion secondary battery) was manufactured as described below.

Test Example 1

(1) Preparation of Positive Electrode

N-methyl-2-pyrrolidone (NMP) as a solvent, a conduction aid (acetylene black), and a binder (PVdF) were mixed and kneaded to prepare a conductive layer composition. The blending amounts of the conduction aid and the binder were set at 50% by mass and 50% by mass, respectively. The prepared conductive layer composition was applied to each of both surfaces of an aluminum foil (thickness: 15 μm) such that the application amount (mass per unit area) after drying became 0.1 g/cm2, followed by drying.

Next, N-methyl-2-pyrrolidone (NMP) as a solvent, a conduction aid (acetylene black), a binder (PVdF), and particles of an active material ($LiNi_{1/3}Co_{1/3}Mn_{1/3}O_2$) were mixed and kneaded to prepare a positive electrode composite. The blending amounts of the conduction aid, the binder, and the active material were set at 4.5% by mass, 4.5% by mass, and 91% by mass, respectively. The prepared positive electrode composite was applied to the conductive layer such that the application amount (mass per unit area) after drying became 10 mg/cm². After the drying, the positive electrode was subjected to roll pressing at a linear pressure of 350 kgf·mm⁻¹. Thereafter, the positive electrode was subjected to vacuum drying to remove, for example, moisture. The thickness of the active material layer (one layer) pressed was 30 μm. The density of the active material layer was 2.6 g/cm³. The porosity of the active material layer was 38%. The thickness of the conductive layer pressed was 1 μm. The density of the conductive layer was 1.0 g/cm³.

Active Material Particles

Used as the active material blended in the composite was secondary particles (coagulated particles) formed by coagulation of primary particles. The primary particles constituting the secondary particles had an average particle size of 0.8 μm. The average particle size is the average diameter Dp described above. The average particle size was determined by measuring diameters of one hundred primary particles in a scanning electron microscope observation image and averaging the measured values. When a primary particle was not spherical, the longest diameter was measured as the diameter. The particles of the active material had an average particle size D50 (volume-based) of 5 μm that was measured by a laser diffraction particle size distribution measuring apparatus described later. Particles of the conduction aid had an average particle size D50 (volume-based) of 40 nm.

(2) Preparation of Negative Electrode

Used as an active material was particulate amorphous carbon (hardly graphitizable carbon). Used as a binder was PVdF. A negative electrode composite was prepared by mixing and kneading NMP as a solvent, the binder, and the active material. The binder was blended in an amount of 7% by mass and the active material was blended in an amount of 93% by mass. The prepared negative electrode composite was applied to each of both surfaces of a copper foil (thickness: 10 μm) such that the application amount (mass per unit area) after drying became 4.0 mg/cm². After dried, the negative electrode was subjected to roll pressing and to vacuum drying to remove, for example, moisture. The thickness of the active material layer (one layer) was 35 μm. The density of the active material layer was 1.2 g/cm³.

(3) Separator

Used as a separator was polyethylene-made fine porous film having a thickness of 22 μm. The air resistance of the polyethylene-made fine porous film was 100 s/100 cc.

(4) Preparation of Electrolyte Solution

Used as an electrolyte solution was one prepared by the following method. Used as a nonaqueous solvent was a solvent obtained by mixing 1 part by volume of each of propylene carbonate, dimethyl carbonate, and ethyl methyl carbonate. $LiPF_6$ was dissolved in this nonaqueous solvent to give a salt concentration of 1 mol/L. Thus, the electrolyte solution was prepared.

(5) Disposition of Electrode Assembly in Case

A battery was manufactured by a general method, using the positive electrode, the negative electrode, the electrolyte solution, the separator, and a case.

First, a sheet-shaped product was wounded that was obtained by layering the positive electrode and the negative electrode with the separator disposed therebetween. Next, the wound electrode assembly was disposed in a case main body of the case, or an aluminum-made prismatic container case. Subsequently, the positive electrode and the negative electrode were electrically connected to two external terminals, respectively. Further, a cover plate was attached to the case main body. The electrolyte solution was injected into the case through an electrolyte solution filling opening formed on the cover plate of the case. Last, the electrolyte solution filling opening of the case was plugged to seal the case.

Particle Size Frequency Distribution of Particles Contained in Positive Active Material Layer The positive electrode was extracted from the battery once manufactured. The extracted positive electrode was pretreated by immersion in NMP having a mass of 50 times or more the mass of the positive electrode and ultrasonic dispersion for 15 minutes. Further, the metal foil was removed from the positive electrode, the positive active material layer was subjected to an ultrasonic dispersion treatment for 15 minutes while immersed in NMP. A dispersion was prepared that contained measurement samples (the active material and the conduction aid). In measurement of a particle size frequency distribution for the measurement samples, used as a measuring apparatus was a laser diffraction particle size distribution measuring apparatus ("SALD 2300" manufactured by SHIMADZU CORPORATION) and used as measurement control software was exclusive application software DMS ver2. A specific measurement technique, with a scattering measurement mode employed, included placing a wet cell, in which the dispersion was circulated, in an ultrasonic environment for 2 minutes, and then irradiating the dispersion with laser light to obtain a scattered light distribution from the measurement samples. Then, the scattered light distribution was approximated by a log-normal distribution to give a particle size frequency distribution, and the measurement was performed within a range in which the minimum was set at 0.021 μm and the maximum was set at 2000 μm in the particle size frequency distribution (horizontal axis, σ).

Particle Size D1 of First Peak and Particle Size D2 of Second Peak

The particle size frequency distribution had two peaks. The particle size at a peak, or a local maximum point in a smaller particle size was defined as a particle size D1 of a first peak. The particle size at a peak, or a local maximum point in a larger particle size was defined as a particle size D2 of a second peak.

Volume Proportion of Particles Having Particle Sizes Equal to or Smaller than Particle Size Dx (Particle Size at Local Minimum Point Between Two Peaks)

The particle size frequency distribution had a local minimum point between the particle sizes D1 and D2. The particle size at the local minimum point was defined as a particle size Dx. The volume proportion of particles having particle sizes equal to or smaller than the particle size Dx was calculated by the exclusive application software described above.

Test Examples 2 to 7

A lithium ion secondary battery was manufactured similarly to Test Example 1 except that the battery was changed to have the configuration shown in Table 1 by changing the pressing pressure to one shown in Table 1 when the positive electrode was prepared.

Figure 8:
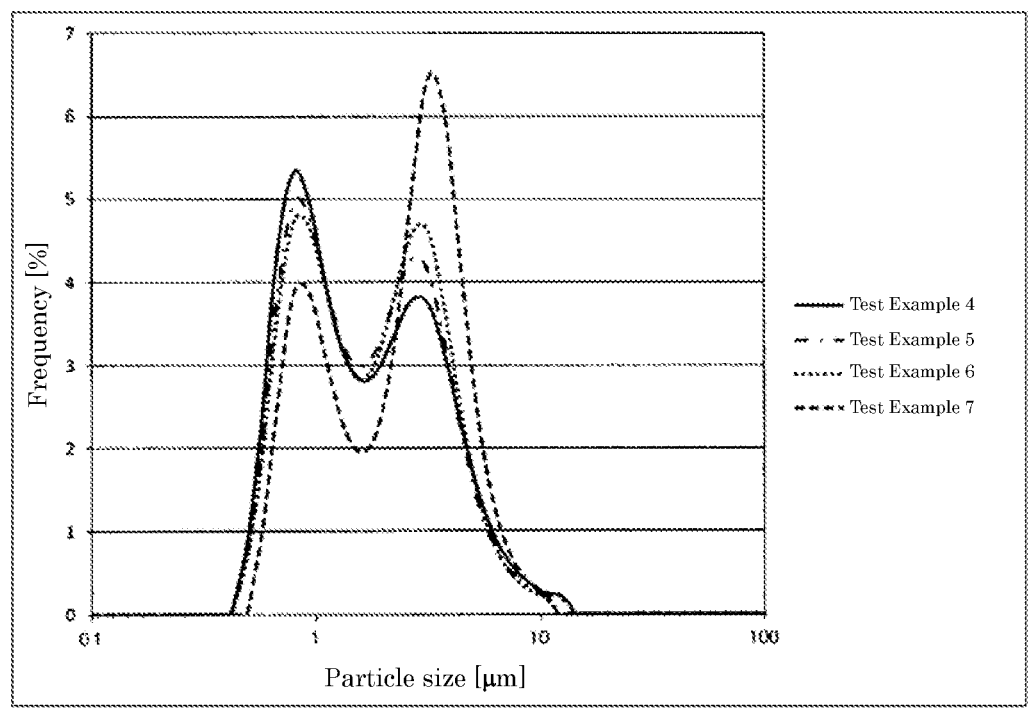
FIG. 8 is a volume-based particle size frequency distribution of particles contained in an active material layer.

FIG. 8 shows a volume-based particle size frequency distribution of the particles contained in the positive active material layer of the battery manufactured in each of Test Examples 4 to 7.

TABLE 1

| Test Example | Volume proportion (%) of particles having particle size equal to or smaller than Dx | D1/Dp | Power ratio (%) in SOC of 15% at minus 10° C. (relative value to Test Example 7) | Power input ratio (%) in SOC of 85% at minus 10° C. (relative value to Test Example 7) | Pressing linear pressure/kgf mm−1 |
|---|---|---|---|---|---|
| 1 | 63 | 0.78 | 103 | 101 | 350 |
| 2 | 62 | 0.79 | 109 | 102 | 235 |
| 3 | 60 | 0.80 | 115 | 104 | 158 |
| 4 | 54 | 0.82 | 114 | 104 | 48 |
| 5 | 52 | 0.82 | 112 | 104 | 27 |
| 6 | 49 | 0.82 | 107 | 102 | 15 |
| 7 | 37 | 0.84 | 100 | 100 | 8 |

<Evaluation of Power Performance and Power Input Performance at Low Temperature>

1. Initial Capacity

The battery was charged at a constant current of 5 A at 25° C. to a voltage of 4.2 V, and further charged at a constant voltage of 4.2 V for three hours in total. Thereafter, the battery was discharged under the conditions of a constant current of 5 A and a final voltage of 2.4 V to measure an initial discharge capacity.

2. Battery Power (W1)

The battery was charged at a constant current of 5 A at 25° C. to a voltage corresponding to an electric amount of 15% of the initial capacity, and further charged at the voltage for two hours in total. For adjustment of the temperature, the battery was stored in an environment of minus 10° C. for four hours. The battery was subjected to constant current discharge at 200 A at minus 10° C. to a voltage of 2.5 V. From a current value A1 and a voltage value V1 in the first second after the start of the discharge, power W1 (W1=A1× V1) was calculated. The ratio (power ratio in SOC of 15% at minus 10° C.) of W1 calculated in each of the test examples to W1 of Test Example 7 was calculated.

3. Battery Power Input (W2)

The battery having undergone the operation in the item 1 described above was discharged under the conditions of 25° C., a constant current of 5 A, and a final voltage of 2.4 V. The battery was charged at a constant current of 5 A at 25° C. to a voltage corresponding to an electric amount of 85% of the initial capacity, and further charged at the voltage for two hours in total. For adjustment of the temperature, the battery was stored in an environment of minus 10° C. for four hours. The battery was subjected to constant current discharge at 200 A at minus 10° C. to a voltage of 4.3 V. From a current value A2 and a voltage value V2 in the first second after the start of the discharge, power input W2 (W2=A2×V2) was calculated. The ratio (power input ratio in SOC of 85% at minus 10° C.) of W2 calculated in each of the test examples to W2 of Test Example 7 was calculated.

Table 1 shows the evaluation results of the power performance at low temperature. As recognized from Table 1, the batteries of Test Examples 2 to 6 sufficiently improved the power performance at low temperature.

DESCRIPTION OF REFERENCE SIGNS

1: Energy storage device (nonaqueous electrolyte secondary battery)
2: Electrode assembly
26: Non-coated layered portion
3: Case
31: Case main body
32: Cover plate
4: Separator
5: Current collector
50: Clip member
6: Insulating cover
7: External terminal
71: Surface
11: Positive electrode
111: Metal foil (current collector foil) of positive electrode
112: Positive active material layer
12: Negative electrode
121: Metal foil (current collector foil) of negative electrode
122: Negative active material layer
91: Bus bar member
100: Energy storage apparatus

The invention claimed is:

1. An energy storage device comprising a positive electrode that includes a positive active material layer, wherein
the positive active material layer contains at least positive active material particles and a binder,
the positive active material particles contained in the positive active material layer after being pressed gives a volume-based particle size frequency distribution that has a first peak and a second peak appearing in a particle size larger than a particle size of the first peak, and
positive active material particles having particle sizes equal to or smaller than a particle size Dx have a volume proportion of 49% or more and 62% or less in a volume of whole positive active material particles contained in the positive active material layer, with the particle size Dx defined as a particle size at a local minimum frequency between the first peak and the second peak in the volume-based particle size frequency distribution.

2. The energy storage device according to claim 1, wherein the positive active material layer contains secondary particles formed by aggregation of primary particles of a positive active material.

3. The energy storage device according to claim 1, wherein the secondary particles of the positive active material have a pore formed therein, with the pore being equal to or larger than particle sizes of the primary particles constituting the secondary particles.

4. The energy storage device according to claim 2, wherein an average diameter Dp of the primary particles and the particle size D1 of the first peak satisfy a relational expression $0.5 \leq D1/Dp \leq 2$.

5. The energy storage device according to claim 1, wherein a particle size D2 of the second peak is 2 μm or more and 5 μm or less.

6. A method for manufacturing an energy storage device, the method comprising preparing a positive electrode that includes a positive active material layer containing at least positive active material particles and a binder,
wherein
the preparing the positive electrode includes pressing the positive active material layer containing the binder and secondary particles formed by aggregation of primary particles of a positive active material,
the pressing the positive active material layer includes:
crushing a part of the secondary particles to allow the positive active material particles contained in the positive active material layer after being pressed to give a volume-based particle size frequency distribution that has a first peak and a second peak appearing in a particle size larger than a particle size of the first peak, and
crushing the part of the secondary particles to allow positive active material particles having particle sizes equal to or smaller than a particle size Dx to have a volume proportion of 49% or more and 62% or less in a volume of whole positive active material particles contained in the positive active material layer, with the particle size Dx defined as a particle size at a local minimum frequency between the first peak and the second peak in the volume-based particle size frequency distribution.

7. The energy storage device according to claim 1, wherein a particle size D1 of the first peak is 0.5 μm or more and 1.0 μm or less.

8. The energy storage device according to claim 1, wherein the particle size Dx is 1.0 μm or more and 3.0 μm or less.

9. The energy storage device according to claim 1, wherein
a mass per unit area of one layer of the positive active material layer is 6 mg/cm² or more and 17 mg/cm² or less,
a density of the positive active material layer is 1.5 g/cm³ or more and 3.0 g/cm³ or less, and
a porosity of the positive active material layer is 25% or more and 45% or less.

10. The energy storage device according to claim 1, wherein
the particle size Dx is 1.0 μm or more and 3.0 μm or less,
a mass per unit area of one layer of the positive active material layer is 6 mg/cm² or more and 17 mg/cm² or less,
a density of the positive active material layer is 1.5 g/cm³ or more and 3.0 g/cm³ or less, and
a porosity of the positive active material layer is 25% or more and 45% or less.

11. The energy storage device according to claim 1, wherein
a particle size D1 of the first peak is 0.5 μm or more and 1.0 μm or less,
the particle size Dx is 1.0 μm or more and 3.0 μm or less,
a mass per unit area of one layer of the positive active material layer is 6 mg/cm² or more and 17 mg/cm² or less,
a density of the positive active material layer is 1.5 g/cm³ or more and 3.0 g/cm³ or less, and
a porosity of the positive active material layer is 25% or more and 45% or less.

12. The method according to claim 6, wherein a particle size D1 of the first peak is 0.5 μm or more and 1.0 μm or less.

13. The method according to claim 6, wherein the particle size Dx is 1.0 μm or more and 3.0 μm or less.

14. The method according to claim 6, wherein
a mass per unit area of one layer of the positive active material layer is 6 mg/cm² or more and 17 mg/cm² or less,
a density of the positive active material layer is 1.5 g/cm³ or more and 3.0 g/cm³ or less, and
a porosity of the positive active material layer is 25% or more and 45% or less.

15. The method according to claim 6, wherein
the particle size Dx is 1.0 μm or more and 3.0 μm or less,
a mass per unit area of one layer of the positive active material layer is 6 mg/cm² or more and 17 mg/cm² or less,
a density of the positive active material layer is 1.5 g/cm³ or more and 3.0 g/cm³ or less, and
a porosity of the positive active material layer is 25% or more and 45% or less.

16. The method according to claim 6, wherein
a particle size D1 of the first peak is 0.5 μm or more and 1.0 μm or less,
the particle size Dx is 1.0 μm or more and 3.0 μm or less,
a mass per unit area of one layer of the positive active material layer is 6 mg/cm² or more and 17 mg/cm² or less,
a density of the positive active material layer is 1.5 g/cm³ or more and 3.0 g/cm³ or less, and
a porosity of the positive active material layer is 25% or more and 45% or less.

* * * * *